US010190880B2

(12) United States Patent
Nozawa

(10) Patent No.: US 10,190,880 B2
(45) Date of Patent: Jan. 29, 2019

(54) ELECTRONIC TIMEPIECE

(71) Applicant: Seiko Epson Corporation, Tokyo (JP)

(72) Inventor: Toshiyuki Nozawa, Okaya (JP)

(73) Assignee: Seiko Epson Corporation (JP)

( * ) Notice: Subject to any disclaimer, the term of this patent is extended or adjusted under 35 U.S.C. 154(b) by 146 days.

(21) Appl. No.: 15/447,572

(22) Filed: Mar. 2, 2017

(65) Prior Publication Data

US 2017/0254647 A1 Sep. 7, 2017

(30) Foreign Application Priority Data

Mar. 7, 2016 (JP) .................................. 2016-043649

(51) Int. Cl.
| | |
|---|---|
| *G01C 17/00* | (2006.01) |
| *G01C 21/00* | (2006.01) |
| *G04B 47/06* | (2006.01) |
| *G01C 21/20* | (2006.01) |
| *G01C 17/14* | (2006.01) |

(52) U.S. Cl.
CPC ........... *G01C 21/005* (2013.01); *G01C 21/20* (2013.01); *G04B 47/06* (2013.01); *G01C 17/14* (2013.01)

(58) Field of Classification Search
CPC ....... G01C 21/005; G01C 21/20; G04B 47/06
USPC .................................................... 33/334, 354
See application file for complete search history.

(56) References Cited

U.S. PATENT DOCUMENTS

| | | | | | |
|---|---|---|---|---|---|
| 2,955,357 | A | * | 10/1960 | Uebelhardt .......... | G04B 47/065 33/272 |
| 4,668,100 | A | * | 5/1987 | Murakami ........... | G04B 47/065 33/354 |
| 4,914,831 | A | * | 4/1990 | Kanezashi ............... | G01B 3/12 33/780 |
| 5,596,551 | A | * | 1/1997 | Born ...................... | G01C 17/30 33/271 |
| 5,790,477 | A | | 8/1998 | Hauke | |
| 5,883,861 | A | * | 3/1999 | Moser .................... | G04B 25/04 33/263 |
| 6,243,660 | B1 | * | 6/2001 | Hsu ........................ | G01C 17/30 33/319 |
| 7,113,451 | B1 | * | 9/2006 | Matthey ................. | G01C 17/30 33/349 |
| 7,466,633 | B2 | * | 12/2008 | Giauque .............. | G04B 47/065 33/354 |

(Continued)

FOREIGN PATENT DOCUMENTS

| | | |
|---|---|---|
| JP | 2000-512014 A | 9/2000 |
| JP | 2015-034825 A | 2/2015 |

*Primary Examiner* — G. Bradley Bennett
(74) *Attorney, Agent, or Firm* — Harness, Dickey & Pierce, P.L.C.

(57) ABSTRACT

An electronic timepiece includes an indicating hand, a distance display hand, a GPS receiver that receives satellite signals transmitted from GPS satellites, a magnetic sensor, and a controller. The controller determines the direction to a destination on the basis of the satellite signals received by the GPS receiver, the output from the magnetic sensor, and destination information representing the position of the destination, determines the distance to the destination on the basis of the satellite signals and the destination information, causes the indicating hand to indicate the direction to the destination, and causes the distance display hand to display the distance to the destination.

13 Claims, 8 Drawing Sheets

(56) References Cited

U.S. PATENT DOCUMENTS

| | | | | |
|---|---|---|---|---|
| 7,487,043 B2* | 2/2009 | Adams | .................... | B63C 11/02 |
| | | | | 114/315 |
| 2002/0023362 A1* | 2/2002 | Kato | ...................... | G01C 17/38 |
| | | | | 33/356 |
| 2007/0266575 A1* | 11/2007 | Nash | ...................... | A62B 99/00 |
| | | | | 33/355 R |
| 2015/0063080 A1* | 3/2015 | Ma | .......................... | G04G 9/04 |
| | | | | 368/83 |
| 2016/0076887 A1* | 3/2016 | Carroll | ................... | G01C 17/34 |
| | | | | 33/228 |
| 2017/0277128 A1* | 9/2017 | Nozawa | ............... | G04B 47/065 |

\* cited by examiner

ELECTRONIC TIMEPIECE

BACKGROUND

1. Technical Field

The present invention relates to an electronic timepiece.

2. Related Art

JP-T-2000-512014 describes a timepiece that performs navigation to a destination by using a digital display, such as a liquid crystal display device.

In a case where an analog timepiece having indicating hands is employed as a timepiece that performs navigation to a destination, the approach described in JP-T-2000-512014, which employs a digital display, cannot be used. Further, in a case where an indicating hand is used to perform navigation to a destination, detailed information cannot be displayed, unlike a digital display. It is therefore desired in a timepiece that performs navigation to a destination by using an indicating hand to provide an approach for intelligibly conveying information necessary for the navigation to the user.

SUMMARY

An advantage of some aspects of the invention is that in a timepiece that performs navigation to a destination using an indicating hand, information necessary for the navigation is intelligibly conveyed to the user.

An electronic timepiece according to an aspect of the invention includes a first indicating hand, a second indicating hand, a receiver that receives position identification information for identifying a current position, a magnetic sensor, and a controller that determines a direction to a destination based on the position identification information received by the receiver, an output from the magnetic sensor, and destination information representing a position of the destination, determines a distance to the destination based on the position identification information and the destination information, causes the first indicating hand to indicate the direction to the destination, and causes the second indicating hand to display the distance to the destination.

The aspect, in which the first indicating hand indicates the direction to the destination and the second indicating hand displays the distance to the destination, allows a timepiece that performs navigation to the destination by using an indicating hand to intelligibly convey information necessary for the navigation to a user.

In the electronic timepiece according to the aspect described above, it is preferable that the controller switches, in accordance with the distance to the destination, a display range of the distance to the destination displayed with the second indicating hand.

According to the aspect with this configuration, since the display range is switched in accordance with the distance to the destination, the distance to the destination displayed with the indicating hand can be intelligibly displayed.

In the electronic timepiece according to the aspect described above, it is preferable that the electronic timepiece further includes a third indicating hand, and that the third indicating hand displays the display range.

According to the aspect with this configuration, the third indicating hand allows the user to grasp the display range of the distance to the destination displayed with the second indicating hand, whereby the user can more readily recognize the distance to the destination than in a case where no display range is displayed.

An electronic timepiece according to another aspect of the invention includes a first indicating hand, a second indicating hand, a receiver that receives position identification information for identifying a current position, a magnetic sensor, and a controller that determines a direction to a destination based on the position identification information received by the receiver, an output from the magnetic sensor, and destination information representing a position of the destination, determines a direction to north based on the output from the magnetic sensor, causes the first indicating hand to indicate the direction to the destination, and causes the second indicating hand to indicate the direction to north.

The aspect, in which the first indicating hand indicates the direction to the destination and the second indicating hand indicates the direction to north, allows a timepiece that performs navigation to the destination by using an indicating hand to intelligibly convey information necessary for the navigation to a user.

An electronic timepiece according to another aspect of the invention includes an indicating hand, a receiver that receives position identification information for identifying a current position, a magnetic sensor, and a controller that determines a direction to a destination based on the position identification information received by the receiver, an output from the magnetic sensor, and destination information representing a position of the destination, determines a direction to north based on the output from the magnetic sensor, and switches the direction indicated with the indicating hand between the direction to the destination and the direction to north.

The aspect, in which the direction indicated with the indicating hand is switched between the direction to the destination and the direction to north, allows a timepiece that performs navigation to the destination by using an indicating hand to intelligibly convey information necessary for the navigation to a user. Further, since the direction indicated with the single indicating hand is switched between the direction to the destination and the direction to north, the user can obtain information necessary for the navigation by looking at the single indicating hand. Moreover, since the single indicating hand indicates the direction to the destination and the direction to north, size reduction is achieved unlike a case where two indicating hands indicate the direction to the destination and the direction to north.

In the electronic timepiece according to the aspect described above, it is preferable that the electronic timepiece further includes an operation section that accepts a user's operation, and that when the operation section accepts the user's operation, the direction indicated with the indicating hand is switched between the direction to the destination and the direction to north by the controller.

According to the aspect with this configuration, when the user desires to know the direction to the destination in the situation in which the indicating hand indicates the direction to north, the user can operate the operation section to know the direction to the destination, whereas when the user desires to know the direction to north in the situation in which the indicating hand indicates the direction to the destination, the user can operate the operation section to know the direction to north.

In the electronic timepiece according to the aspect described above, it is preferable that the electronic timepiece further includes a direction display section that displays the direction indicated with the indicating hand, the direction to the destination or the direction to north.

According to the aspect with this configuration, whether the indicating hand indicates the direction to the destination or the direction to north can be readily visually recognized.

In the electronic timepiece according to the aspect described above, it is preferable that the destination information is any of a plurality of pieces of positional information to each of which a number is given in advance, and that the electronic timepiece further includes a number display section that displays the number given to positional information used as the destination information among the plurality of pieces of positional information.

According to the aspect with this configuration, since the number given to the positional information used as the destination information is displayed, the destination under the navigation can be recognized in the form of the number.

In the electronic timepiece according to the aspect described above, it is preferable that each of the plurality of pieces of positional information is information representing a position on a single path, and that the numbers are numbers according to an order in accordance with which the positions indicated by the plurality of pieces of positional information are arranged along the path.

According to the aspect with this configuration, since the numbers are numbers according to the order in accordance with which the positions indicated by the plurality of pieces of positional information are arranged along the path, the user can readily recognize which position on the path corresponds to the destination under the navigation.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
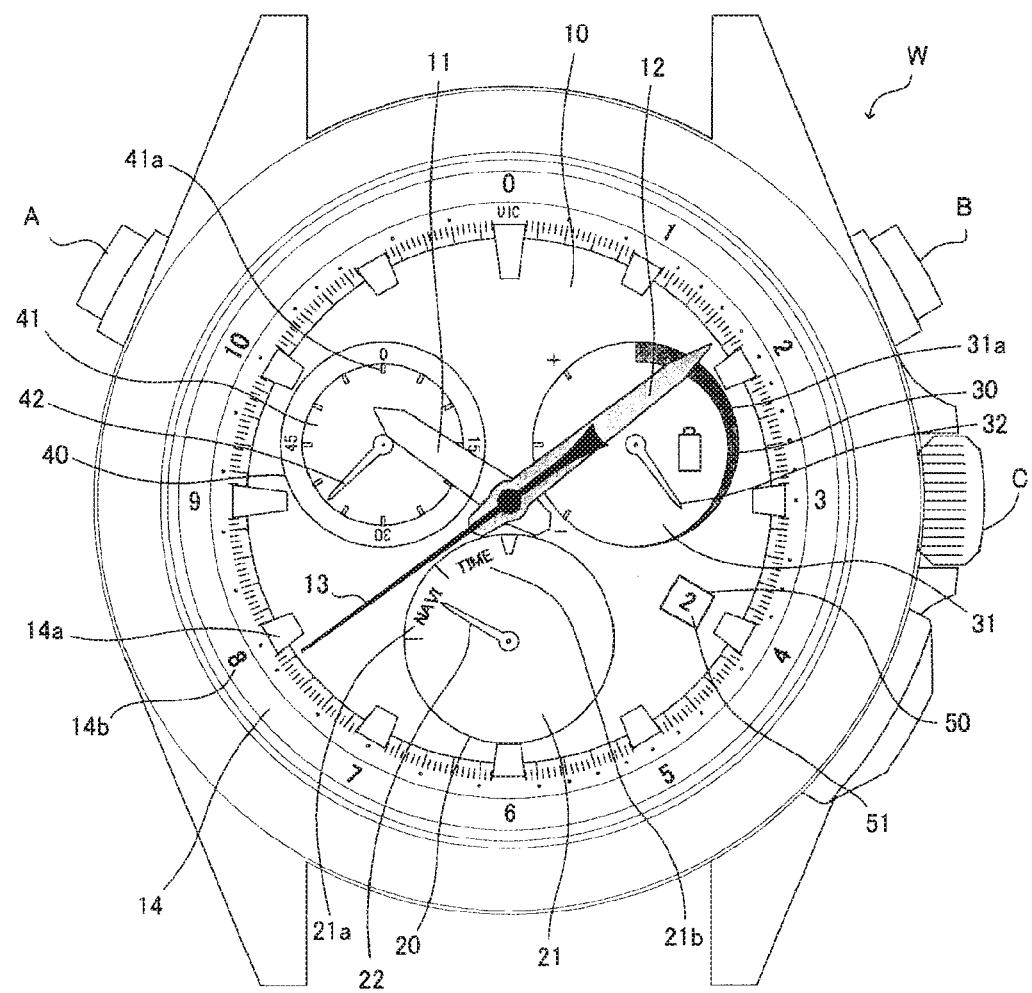
FIG. 1 is a plan view showing an electronic timepiece according to an embodiment of the invention.

Embodiments according to the invention will be described below with reference to the drawings. In the drawings, the dimension and scale of each portion differ from actual values as appropriate. Further, since the embodiments described below are preferable specific examples of the invention, a variety of technically preferable restrictions are imposed on the embodiments, but the scope of the invention is not limited to the restricted forms unless otherwise particularly stated in the following description that a restriction is imposed on the invention.

FIG. 1 is a plan view showing a sensor-equipped electronic timepiece W according to the present embodiment (hereinafter simply referred to as "electronic timepiece").

Overview of Electronic Timepiece W

An overview of the electronic timepiece W will first be described.

The electronic timepiece W has, as action modes, a navigation mode in which the electronic timepiece W performs navigation to a destination and a time display mode in which the electronic timepiece W displays time.

In the navigation mode, the electronic timepiece W can perform, for example, navigation that allows a user to return to a departure location. To perform the navigation, a location registration switch A and a navigation start switch B are used.

Overview of Location Registration Action

When the user continuously presses down the location registration switch A for at least a specific period (2 seconds, for example) at a departure location, the electronic timepiece W acquires the coordinates (coordinates of position) of the departure location and holds the coordinates. The coordinates of the departure location are used as the coordinates of a destination. The coordinates of the destination are an example of destination information representing the position of the destination. The electronic timepiece W acquires the coordinates of the departure location (current location) by using a GPS. The coordinates of a position are therefore expressed by the latitude and longitude. The specific period is not limited to 2 seconds and can be changed as appropriate.

Overview of Navigation Action

After the position registration, when the user travels with the electronic timepiece W to another location and the user continuously presses down the navigation start switch B for at least a predetermined period (2 seconds, for example), the electronic timepiece W sets the action mode to be the navigation mode. The predetermined period is not limited to 2 seconds and can be changed as appropriate.

In the navigation mode, the electronic timepiece W acquires the coordinates of the current location once or on a regular basis by using the GPS and further acquires the direction to the north on a regular basis by using a magnetic sensor, which will be described later.

In the navigation mode, the electronic timepiece W, whenever it acquires the coordinates of the current location, uses the coordinates of the departure location and the latest coordinates of the current location to calculate the distance to the departure location and the direction from the current location to the departure location.

Having calculated the direction to the departure location and the distance to the departure location, the electronic timepiece W performs navigation that allows the user to return to the departure location by causing an indicating hand 13 to indicate the direction to the departure location with reference to the direction to the north acquired by using the magnetic sensor, causing a second hand 42 to indicate the direction to the north, and causing an hour hand 11 and a minute hand 12 to display the distance to the departure location.

Use of GPS

A description will next be made of a method in which the electronic timepiece W determines the coordinates of the current location (positional information) and time information by using an electric wave (electric waves from GPS satellites), which is an example of an external signal.

Figure 2:
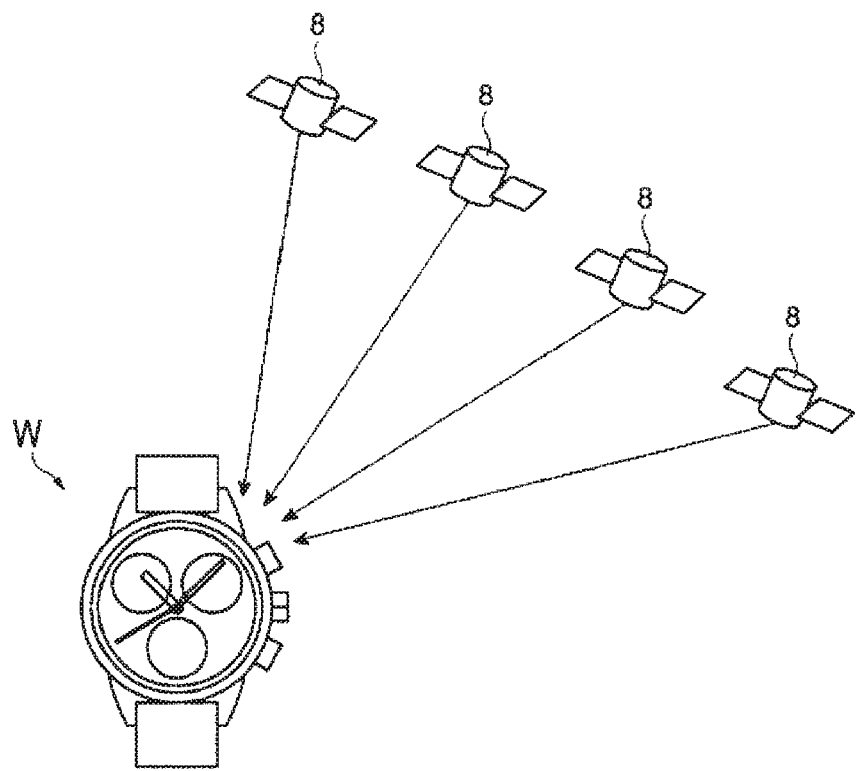
FIG. 2 is a general view of a GPS including the electronic timepiece.

FIG. 2 is a general view of the GPS including the electronic timepiece W.

The electronic timepiece W is a wristwatch that receives electric waves from GPS satellites 8 (satellite signals) and corrects the time measured with an internal timepiece (RTC 1, which will be described later). The electronic timepiece W displays the time and other pieces of information on the side (hereinafter referred to as "front side") opposite the side (hereinafter referred to as "rear side") in contact with an arm. Each of the GPS satellites 8 is a navigation satellite that goes along a predetermined orbit around the earth up in the sky. Each of the GPS satellites 8 transmits a 1.57542-GHz electric wave with a navigation message superimposed thereon (L1 wave) to the ground. In the following description, the 1.57542-GHz electric wave with a navigation message superimposed thereon is referred to as a satellite signal. The satellite signal is a right-handed circularly polarized wave.

At present, approximately 31 GPS satellites 8 (FIG. 2 shows only 4 of them) are present. To identify which of the GPS satellites 8 has transmitted the satellite signals, each of the GPS satellites 8 superimposes a specific pattern called a C/A code (coarse/acquisition code) and formed of 1023 bits (having a cycle of 1 ms) on the satellite signal. Each of the bits is +1 or −1. The C/A code therefore appears to have a random pattern.

Each of the GPS satellites 8 has an atomic clock incorporated therein. The satellite signal contains very accurate GPS time information clocked by the atomic clock. Further, a ground control segment measures a slight time error produced by the atomic clock incorporated in each of the GPS satellites 8. The satellite signal also contains a time correction parameter for correction of the time error. The electronic timepiece W receives the satellite signal (electric wave) transmitted from one of the GPS satellites 8 and uses the GPS time information and the time correction parameter contained in the satellite signal to achieve correct time (time information), to which the time clocked by the internal timepiece (RTC 1) is set.

The satellite signal further contains orbit information representing the on-orbit position of the GPS satellite 8. The electronic timepiece W can perform positioning calculation by using the GPS time information and the orbit information.

The positioning calculation is performed on the assumption that the time clocked by the internal timepiece of the electronic timepiece W contains an error to some extent. That is, not only parameters x, y, and z for identification of the three-dimensional position of the electronic timepiece W but also the time error are unknown. The electronic timepiece W therefore typically receives the satellite signals transmitted from at least four GPS satellites 8 and uses the GPS time information and the orbit information contained in the received satellite signals for the positioning calculation to determine information on the position of the current location (coordinates of current location). The satellite signal is an example of position identification information for identifying the current position.

Referring back to FIG. 1, the description thereof resumes.

The electronic timepiece W includes a time display section 10, the location registration switch A, the navigation start switch B, and a crown switch C.

The time display section 10 includes the hour hand 11, the minute hand 12, the indicating hand 13, a dial ring 14, a 6-o'clock-side information display section 20, which is provided on the 6 o'clock side, a 2-o'clock-side information display section 30, which is provided on the 2 o'clock side, a 10-o'clock-side information display section 40, which is provided on the 10 o'clock side, and a date display section 50.

Markings 14*a* are formed in a 12-hour-clock annular shape on the dial ring 14, and markings 14*b* from 0 to 10 are formed in an annular shape outside the markings 14*a*.

When the action mode is the time display mode, the time display section 10 cause the hour hand 11 and the minute hand 12 to display the time with reference to the markings 14*a*. The positions indicated with the hour hand 11 and the minute hand 12 are changed in accordance, for example, with the user's operation of the crown switch C.

When a chronograph function (stopwatch function) is activated in the time display mode (for example, when the navigation start switch B is pressed down for a period shorter than the predetermined period (2 seconds, for example) in the time display mode), the time display section 10 causes the indicating hand 13 to display the time clocked by the stopwatch function.

When the action mode is the navigation mode, the time display section 10 causes the indicating hand 13 to indicate the direction to a destination and further causes the hour hand 11 and the minute hand 12 to display the distance to the destination with reference to the markings 14*b*. In this process, the numerals of the markings 14*b* are each used as the value at the unit's place of the distance expressed in "km" and indicated with the hour hand 11 or used as the value at the hundred's place of the distance expressed in "m" and indicated with the minute hand 12. In the example shown in FIG. 1, in which the hour hand 11 indicates "10" and the minute hand 12 indicates "1", 10.1 km is displayed as the distance to the destination (remaining distance). The indicating hand 13 is an example of a first indicating hand.

The 6-o'clock-side information display section 20 includes a dial 21 and a mode indicating hand 22.

Letters representing the action mode are inscribed on the dial 21. Specifically, letters 21*a* "NAVI," which represents the navigation mode, are inscribed on the dial 21, letters 21*b* "TIME", which represents the time display mode, are also inscribed on the dial 21.

The 6-o'clock-side information display section 20 displays that the action mode is the navigation mode by causing the mode indicating hand 22 to indicate the letters 21*a* "NAVI." Further, the 6-o'clock-side information display section 20 displays that the action mode is the time display mode by causing the mode indicating hand 22 to indicate the letters 21*b* "TIME."

The 2-o'clock-side information display section 30 includes a dial 31 and a remaining amount indicating hand 32.

The dial 31 is provided with a remaining amount meter 31*a*, which shows the remaining amount of a battery used as the power source of the electronic timepiece W.

The 2-o'clock-side information display section 30 displays the remaining amount of the battery by causing the remaining amount indicating hand 32 to indicate any point of the remaining amount meter 31*a*.

The 10-o'clock-side information display section 40 includes a dial 41 and the second hand 42. The second hand 42 is an example of a second indicating hand.

The dial 41 is provided with markings 41*a*, which represents the second.

When the action mode is the time display mode, the 10-o'clock-side information display section 40 causes the second hand 42 to display the second of the time. When the action mode is the navigation mode, the 10-o'clock-side information display section 40 causes the second hand 42 to display the direction to the north.

The date display section 50 includes a date indicator 51, which displays the calendar date.

As a supplemental remark on FIG. 1, since the mode indicating hand 22 indicates the letters 21 "NAVI," the 6-o'clock-side information display section 20 displays the navigation mode as the action mode.

Since the action mode is the navigation mode, the second hand 42 indicates the direction to the north instead of the second, the indicating hand 13 indicates the direction tow the departure location (destination), and the hour hand 11 and the minute hand 12 display the distance to the departure location instead of the time. Further, the 2-o'clock-side information display section 30 causes the remaining amount indicating hand 32 to display the remaining amount of the battery. The date display section 50 displays "the second of the month."

Figure 3:
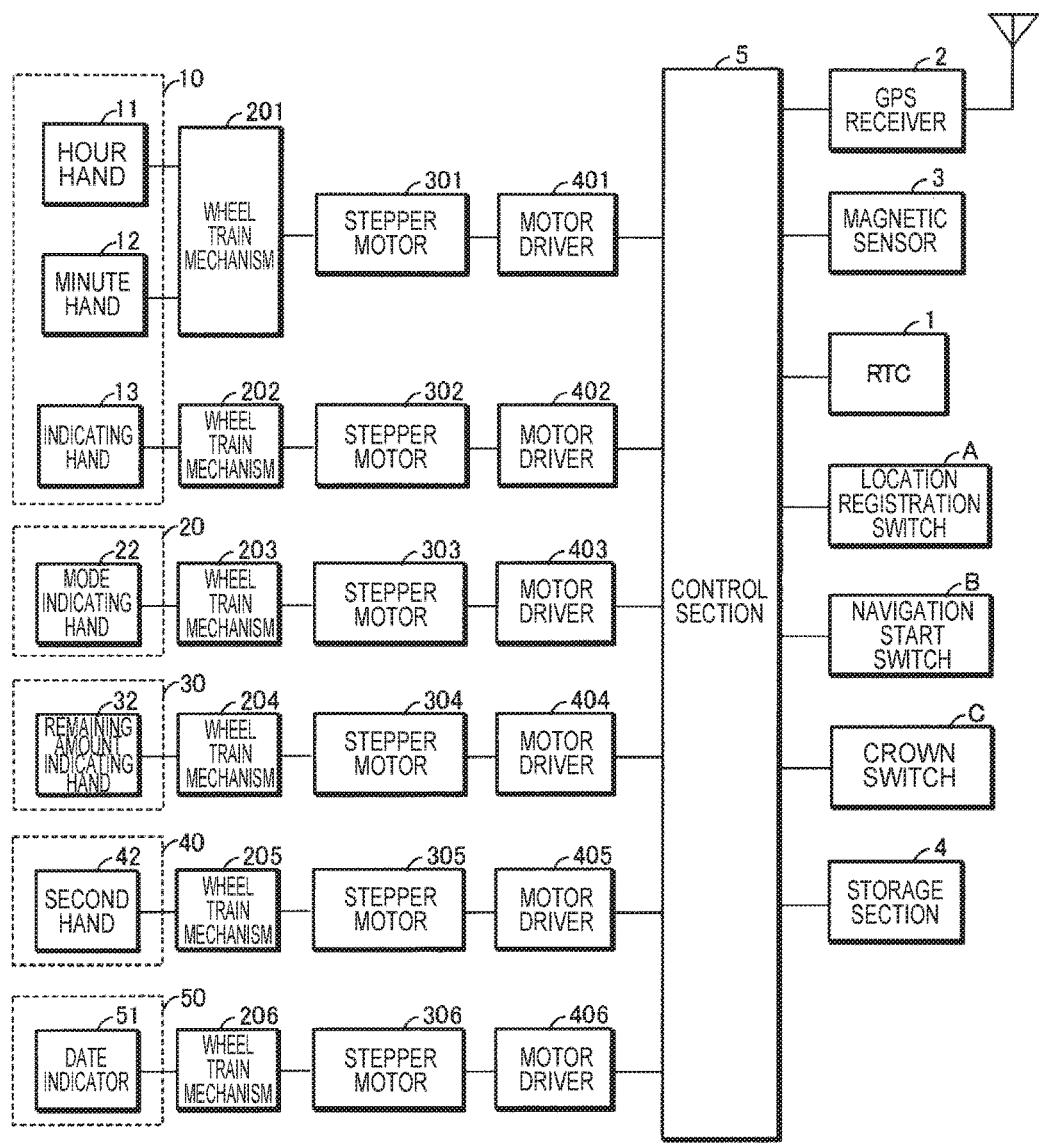
FIG. 3 is a configuration diagram of the electronic timepiece.

FIG. 3 is a configuration diagram of the electronic timepiece W. In FIG. 3, the same configurations as those shown in FIG. 1 have the same reference characters.

The electronic timepiece W includes, as the configuration of the time display section 10, the hour hand 11, the minute hand 12, the indicating hand 13, wheel train mechanisms 201 and 202, stepper motors 301 and 302, and motor drivers 401 and 402. The motor driver 401 drives the stepper motor 301 for driving the hour hand 11 and the minute hand 12 via the wheel train mechanism 201. The motor driver 402 drives the stepper motor 302 for driving the indicating hand 13 via the wheel train mechanism 202.

The electronic timepiece W includes, as the configuration of the 6-o'clock-side information display section 20, the mode indicating hand 22, a wheel train mechanism 203, a stepper motor 303, and a motor driver 403. The motor driver 403 drives the stepper motor 303 for driving the mode indicating hand 22 via the wheel train mechanism 203.

The electronic timepiece W includes, as the configuration of the 2-o'clock-side information display section 30, the remaining amount indicating hand 32, a wheel train mechanism 204, a stepper motor 304, and a motor driver 404. The motor driver 404 drives the stepper motor 304 for driving the remaining amount indicating hand 13 via the wheel train mechanism 204.

The electronic timepiece W includes, as the configuration of the 10-o'clock-side information display section 40, the second hand 42, a wheel train mechanism 205, a stepper motor 305, and a motor driver 405. The motor driver 405 drives the stepper motor 305 for driving the second hand 42 via the wheel train mechanism 205.

The electronic timepiece W includes, as the configuration of the date display section 50, the date indicator 51, a wheel train mechanism 206, a stepper motor 306, and a motor driver 406. The motor driver 406 drives the stepper motor 306 for driving the date indicator 51 via the wheel train mechanism 206.

The electronic timepiece W further includes the RTC (real-time clock) 1, a GPS receiver 2, a magnetic sensor 3, a storage section 4, and a controller 5.

The RTC 1 clocks time by using a reference signal outputted from a quartz oscillator (not shown).

The GPS receiver 2 receives the satellite signals (electric waves) transmitted from the GPS satellites 8. The GPS receiver 2 is an example of a reception section that receives the position identification information for identifying the current position.

The magnetic sensor 3 detects terrestrial magnetism, that is, the magnetic north.

The storage section 4 is, for example, a non-transitory storage medium and records a computer program.

The controller 5 is, for example, a CPU and reads and executes the computer program stored in the storage section 4 to achieve a variety of functions. For example, the controller 5 uses the satellite signals received by the GPS receiver 2 to identify the coordinates (coordinates of position) of the current location. The controller 5 further uses the hour hand 11, the minute hand 12, the indicating hand 13, and the second hand 42 to perform navigation to the departure location (destination).

Description of Action

The action of the electronic timepiece W will next be described primarily on the navigation mode.

Location Registration Action

Figure 4:
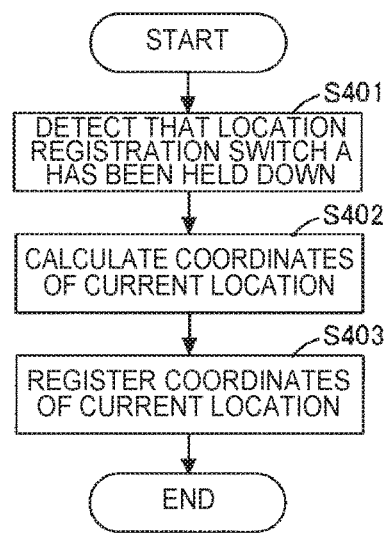
FIG. 4 is a flowchart for describing location registration action.

FIG. 4 is a flowchart for describing the location registration action.

For example, the controller 5, when it detects that the location registration switch A has been continuously pressed down at least for the specific period (2 seconds, for example) at the departure location (location registration switch A has been held down) (step S401), activates the GPS receiver 2 and accepts the satellite signals transmitted from the GPS satellites 8 via the GPS receiver 2. The controller 5 subsequently calculates the coordinates of the current location by using the satellite signals (step S402). The controller 5 subsequently stores (registers) the coordinates of the current location in the storage section 4 (step S403). The coordinates stored in the storage section 4 are used as the destination information representing the position of the destination.

Navigation Action

Figure 5:
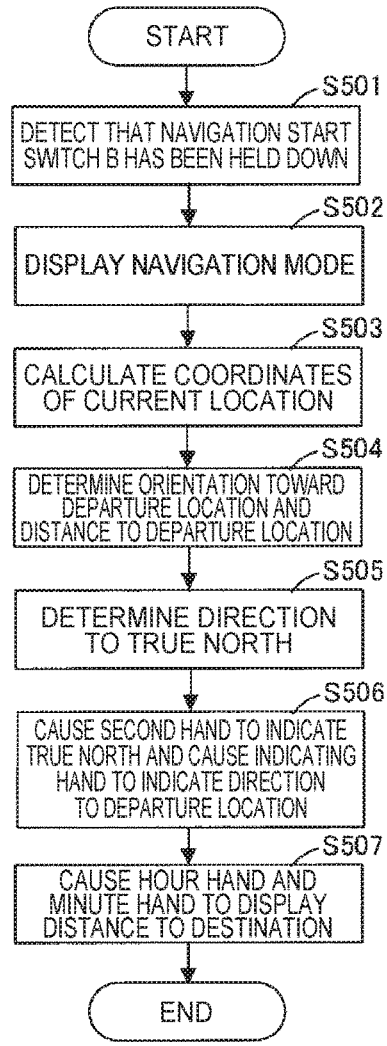
FIG. 5 is a flowchart for describing navigation action.

FIG. 5 is a flowchart for describing the navigation action.

The controller 5, when it detects that the navigation start switch B has been continuously pressed down at least for the predetermined period (2 seconds, for example) in the situation in which the action mode is the time display mode (navigation start switch B has been held down in time display mode) (step S501), causes the action mode to transition to the navigation mode and drives the motor driver 403 in such a way that the mode indicating hand 22 indicates the letters 21a "NAVI" (step S502).

The controller 5 subsequently activates the GPS receiver 2 and receives the satellite signals transmitted from the GPS satellites 8 via the GPS receiver 2. The controller 5 subsequently calculates the coordinates of the current location by using the satellite signals (step S503).

The controller 5 subsequently uses the coordinates stored in the storage section 4 as the destination information and uses the destination information (coordinates of destination) and the latest coordinates of the current location to determine the orientation toward the departure location viewed from the current location and the distance between the current location and the departure location (distance to departure location) (step S504).

The controller 5 subsequently activates the magnetic sensor 3 and determines the direction to the magnetic north on the basis of the output from the magnetic sensor 3. The controller 5 subsequently corrects the direction to the magnetic north by using declination information stored in the storage section 4 in advance to determine the direction to the true north (step S505). In a case where the storage section 5 stores a declination table representing the relationship between the declination and the positional coordinates, the controller 5 may read the declination corresponding to the coordinates of the current location from the declination table and correct the direction to the magnetic north by using the read declination to determine the direction to the true north.

The controller 5 subsequently controls the motor driver 405 in such a way that the second hand 42 indicates the direction to the true north and controls the motor driver 402 in such a way that the indicating hand 13 indicates the direction to the departure location (direction to destination) (step S506). In this process, the controller 5 determines the direction to the departure location (direction to destination) on the basis of the orientation toward the departure location and the direction to the true north.

The controller 5 subsequently controls the motor driver 401 in such a way that the hour hand 11 and the minute hand 12 display the distance to the destination (remaining distance) (step S507).

Thereafter, as long as the navigation mode continues, the controller 5 calculates the coordinates of the current location by using the satellite signals, determines the direction to the true north by using the output from the magnetic sensor 3, and determines the distance between the current location and the departure location by using the destination information and the coordinates of the current location on a regular basis and uses results of the action described above to update the following displayed information on a regular basis: the direction to the destination; the displayed direction to the true north; and the displayed distance to the destination.

To save electric power, when the duration of the navigation mode exceeds a predetermined threshold period (2 minutes, for example), the controller 5 stops the action of determining the true north by using the magnetic sensor 3, the action of indicating the directions described above by using the second hand 42 and the indicating hand 13, and the action of displaying the distance described above by using he hour hand 11 and the minute hand 12 but causes the hour hand 11 and the minute hand 12 to display the time. For example, the controller 5 may forcibly change the action mode from the navigation mode to the time display mode when the duration of the navigation mode exceeds the predetermined threshold period. The predetermined threshold period is not limited to 2 minutes and can be changed as appropriate.

As another method for saving electric power, the calculation of the coordinates of the current location by using the satellite signals may be performed only once, and only the action of determining the direction to the true north by using the output from the magnetic sensor 3 may be performed on a regular basis. In this case, the distance to the destination is not updated, but the direction to the destination and the direction to the true north are updated on a regular basis. In a case where the user remains in the same position but only the orientation of the user changes, the action described above suffices.

The present embodiment, in which the indicating hand 13 indicates the direction to the destination, the second hand 42 indicates the direction to the north, and the hour hand 11 and the minute hand 12 display the distance to the destination, allows a timepiece that performs navigation to the destination by using an indicating hand to intelligibly convey information necessary for the navigation to the user.

In the present embodiment, in particular, different indicating hands indicate the direction to the destination and the direction to the north at the same time, whereby the user can grasp the direction to the destination at a glance.

Variations

The invention is not limited to the embodiment described above, and a variety of variations are conceivable, for example, those described below. Further, one or more variations arbitrarily selected from the aspects of the variation described below can be combined with one another as appropriate.

Variation 1

In the present embodiment described above, after the location registration switch A is continuously pressed down at a departure location at least for the specific period and the departure location is registered as the destination, the navigation that allows the user to return to the departure location is performed.

To perform the navigation that allows the user to return to the departure location, the controller 5 may instead register a plurality of points (way points) on a path along which the user travels in the storage section 4, use one of the plurality of registered points as the destination, and switch the point used as the destination to another in response to the user's operation to eventually navigate the user to the departure location.

For example, in a state in which the coordinates of destinations registered in the past in the storage section 4 are all erased, the user continuously presses down the location registration switch A at least for the specific period at each of the plurality of points on the travel path to allow the electronic timepiece W sequentially to register the coordinates of the points (coordinates of destinations). In this process, the controller 5 gives the coordinates of each of the points the number in the order in accordance with which the points are registered and stores the coordinates of the point to which the number is given in the storage section 4.

As an example, the controller 5 gives the coordinates of the n-th registered point (n is integer greater than or equal to 1) a number "n" and stores the coordinates of the point to which the number "n" is given in the storage section 4.

Figure 6:
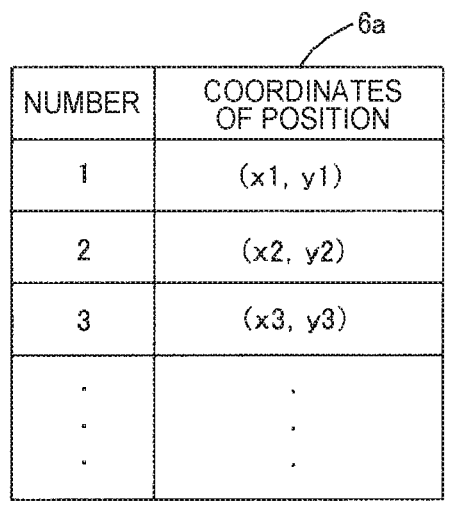
FIG. 6 shows an example of a destination management table.

FIG. 6 shows an example of a destination management table 6a in which the storage section 4 manages the coordinates of the points to each of which a number is given. In this case, the coordinates of each point registered before the navigation starts (coordinates of each destination) are given a number in advance.

For example, in a case where the location registration switch A and the navigation start switch B are both pressed down, the controller 5 erases all number-given point coordinates registered in the destination management table 6a (coordinates of destinations stored in the past in the storage section 4).

The controller 5 uses one of a plurality of registered points as the destination, performs the navigation to the destination, and controls the motor driver 406 in such a way that the date indicator 51 displays the number (n) given to the coordinates of the point used as the destination.

For example, in a case where the user allows the electronic timepiece W (storage section 4) to register coordinates of n points on a single path, the controller 5 uses the coordinates of the point which was registered last and to which the number "n" was given as the destination (destination information), performs the navigation to the point to which the number "n" was given, and causes the date indicator 51 to display "n". The date indicator 51 is an example of a number display section that displays the number given to positional information used as the destination information among a plurality of pieces of positional information. The number given to the positional information used as the destination information is not necessarily displayed with the date indicator 51 and may be displayed with an indicating hand (remaining amount indicating hand 32, for example).

Thereafter, when the user determines that the user has returned to the point to which the number "n" was given with the aid of the navigation performed by the electronic timepiece W, the user operates the navigation start switch B and the crown switch C (for example, presses down the navigation start switch B with the crown switch C pulled out) to switch the destination from the coordinates of the point to which the number "n" was given to the coordinates of the point to which the number "n−1" was given. In response to the switching, the electronic timepiece W starts navigation to the point to which the number "n−1" was given. Thereafter, similarly switching the destination in such a way that the number displayed in the date indicator 51 is decremented by 1 allows the navigation that allows the user to return to the departure location to be performed.

Variation 2

In the present embodiment described above, the controller 5 registers the coordinates of the departure location (destination information) in the storage section 4 in response to the user's operation of the location registration switch A. The destination information may instead be registered in advance in the storage section 4. For example, the coordinates of the position of Mecca may be registered as the coordinates of a destination in advance in the storage section 4. In this case, Qibla (direction in which Muslims pray) may be displayed as the direction to the destination.

Variation 3

Figure 7:
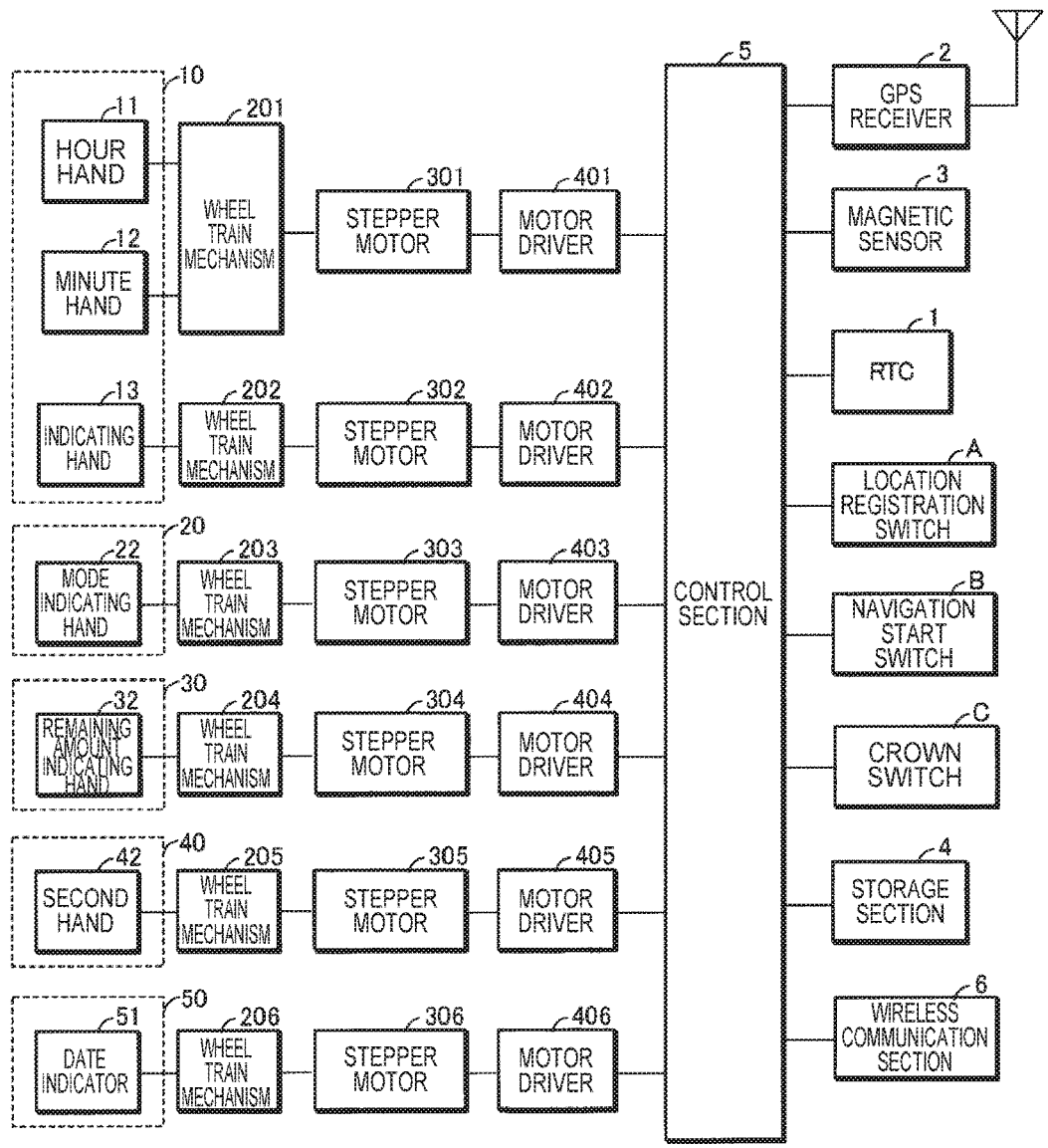
FIG. 7 is a configuration diagram showing a variation.

The electronic timepiece W may be provided with a wireless communication section 6, as shown in FIG. 7, and the coordinates of a destination may be registered from a communication apparatus, such as a smartphone, via the wireless communication section 6.

Second Embodiment

Figure 8:
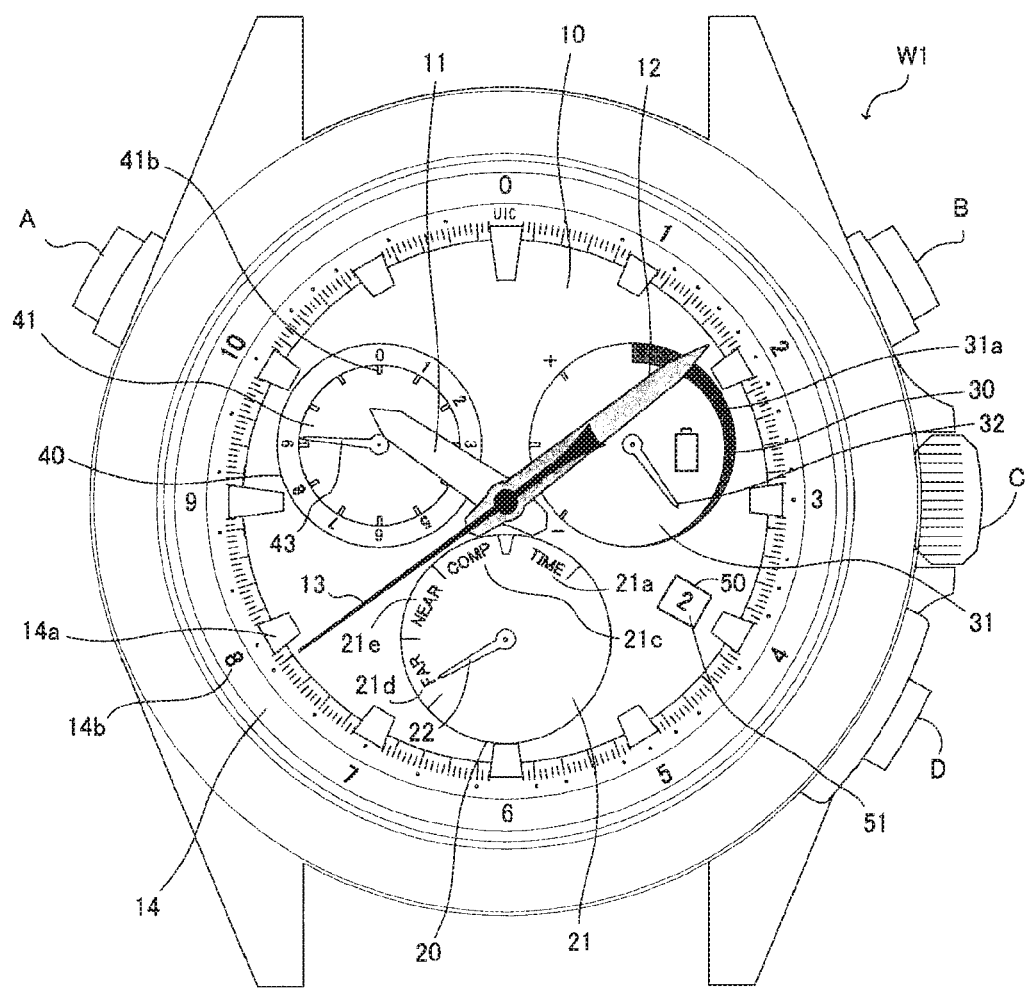
FIG. 8 is a plan view showing an electronic timepiece according to a second embodiment.
Figure 9:
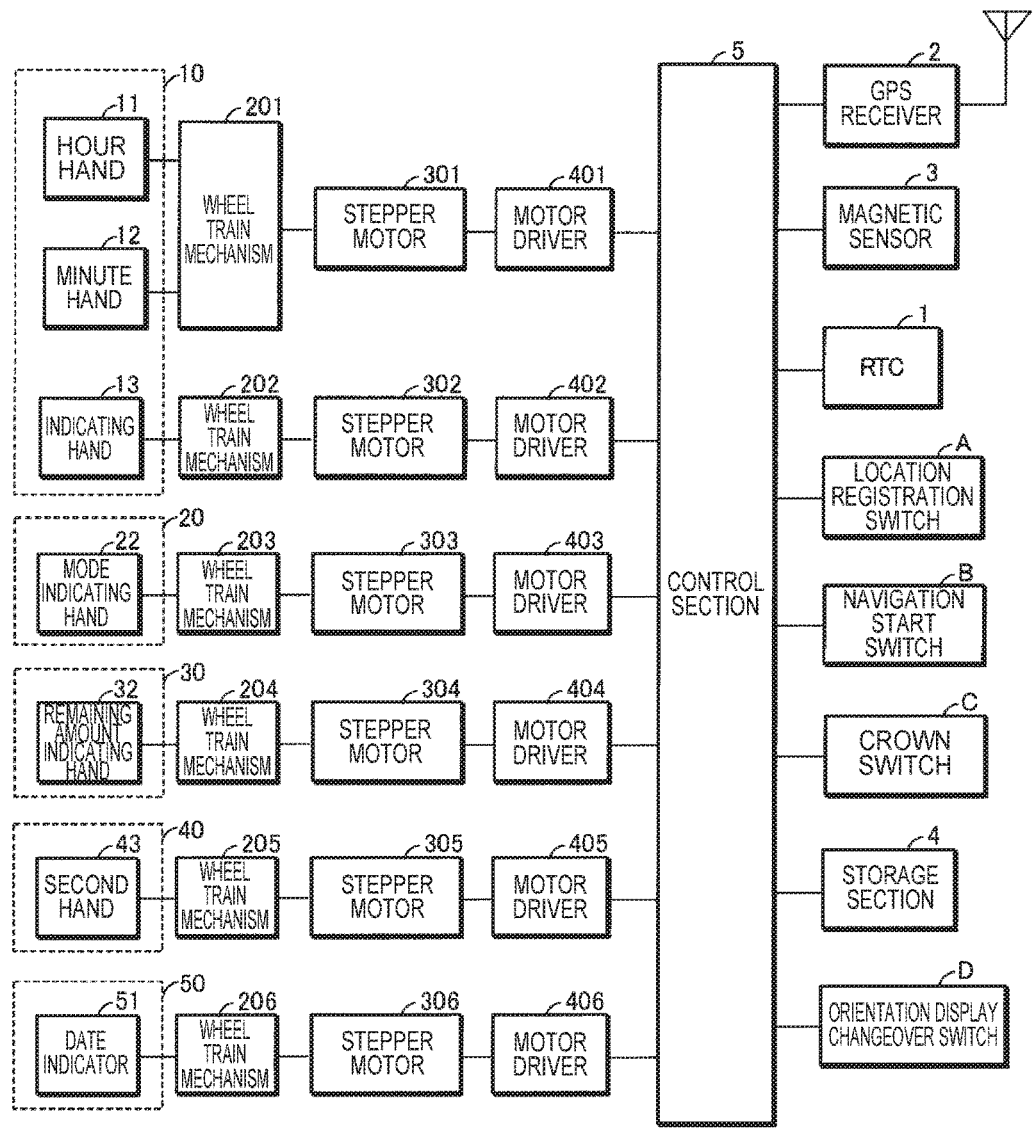
FIG. 9 is a configuration diagram of the electronic timepiece according to the second embodiment.

FIG. 8 is a plan view showing an electronic timepiece W1 according to a second embodiment of the invention. FIG. 9 is a configuration diagram of the electronic timepiece W1. In FIGS. 8 and 9, the same configurations as those shown in FIG. 1 or 3 have the same reference characters.

The electronic timepiece W1 includes an orientation display changeover switch D in addition to the configuration of the electronic timepiece W. The orientation display changeover switch D is an example of an operation section that accepts the user's operation. The 10-o'clock-side information display section 40 includes a distance display hand 43 in place of the second hand 42.

The electronic timepiece W1 according to the second embodiment differs from the electronic timepiece W according to the first embodiment in terms of information displayed by the time display section 10, information displayed by the 6-o'clock-side information display section 20, and information displayed by the 10-o'clock-side information display section 40.

The controller 5 causes the hour hand 11 and the minute hand 12 to display the time with reference to the markings 14a irrespective of the action mode.

The controller 5 causes the indicating hand 13 to display the second of the time in the time display mode.

In the navigation mode, the controller 5 switches the direction indicated with the indicating hand 13 between the direction to the destination and the direction to the true north. In the present embodiment, the controller 5, when it accepts the user's operation of pressing down the orientation display changeover switch D in the navigation mode, switches the direction indicated with the indicating hand 13 between the direction to the destination and the direction to the true north. For example, when the indicating hand 13 indicates the direction to the destination, and the controller 5 accepts the user's operation of pressing down the orientation display changeover switch D, the controller 5 switches the direction indicated with the indicating hand 13 to the direction to the true north. On the other hand, when the indicating hand 13 indicates the direction to the true north, and the controller 5 accepts the user's operation of pressing down the orientation display changeover switch D, the controller 5 switches the direction indicated with the indicating hand 13 to the direction to the destination. The indicating hand 13 thus alternately indicates the direction to the destination and the direction to the true north in accordance with the user's operation of pressing down the orientation display changeover switch D.

When the indicating hand 13 indicates the direction to the true north, the controller 5 causes the mode indicating hand 22 of the 6-o'clock-side information display section 20 to indicate letters 21c "COMP" on the dial 21. On the other hand, when the indicating hand 13 indicates the direction to the destination, the controller 5 causes the mode indicating hand 22 of the 6-o'clock-side information display section 20 to indicate a portion other than the letters 21c "COMP" (letters 21d "FAR" on dial 21 or letters 21e "NEAR" on dial 21). The user can therefore determine whether the indicating hand 13 indicates the direction to the destination or the direction to the true north by looking at the letters indicated with the mode indicating hand 22 of the 6-o'clock-side information display section 20. The single indicating hand 13 can thus display two pieces of orientation information (direction to destination and direction to true north). The mode indicating hand 22 is an example of a direction display section that displays the direction indicated with the indicating hand 13, the direction to the destination or the direction to the north.

The controller 5 causes the distance display hand 43 of the 10-o'clock-side information display section 40 to display the distance to the destination. In the 10-o'clock-side information display section 40, markings 41b from 0 to 9 are formed in an annular shape in place of the markings 41a.

When the indicating hand 13 indicates the direction to the destination, and the distance to the destination is longer than or equal to 1 km, the controller 5 causes the mode indicating hand 22 of the 6-o'clock-side information display section 20 to indicate the letters 21d "FAR" on the dial 21. When the mode indicating hand 22 indicates the letters 21d "FAR," the controller 5 uses the numeral markings 41b inscribed on the dial 41 of the 10-o'clock-side information display section 40 as 1-km-unit markings to set the distance range of the distance to the destination to be 10 km. In the example shown in FIG. 8, since the mode indicating hand 22 indicates the letters 21d "FAR," the indicating hand 13 displays 9 km.

On the other hand, when the indicating hand 13 indicates the direction to the destination, and the distance to the destination is shorter than 1 km, the controller 5 causes the mode indicating hand 22 of the 6-o'clock-side information display section 20 to indicate the letters 21e "NEAR" on the dial 21. When the mode indicating hand 22 indicates the letters 21e "NEAR," the controller 5 uses the numeral markings 41b inscribed on the dial 41 of the 10-o'clock-side information display section 40 as 100-m-unit markings to set the distance range of the distance to the destination to be 1000 m. For example, in the example shown in FIG. 8, when the mode indicating hand 22 indicates the letters 21e "NEAR," the mode indicating hand 22 displays 900 m.

As described above, the controller 5 switches the display range of the distance to the destination displayed with the distance display hand 43 to an appropriate range in accordance with the distance to the destination. A detail distance can therefore be displayed in the limited display aspect using an indicating hand. The mode indicating hand 22 is also an example of a third indicating hand.

Variations

The changes made to the first embodiment (Variations 1 to 3, for example) may be made also to the present embodiment.

Further, in the present embodiment, the single distance display hand 43 is used to indicate the distance to the destination in the 10-o'clock-side information display section 40. Instead, two indicating hands may be used to indicate the distance to the destination in the 10-o'clock-side information display section 40. In this case, the two indicating hands desirably indicate the distance to the destination, as the hour hand 11 and the minute hand 12 indicate the distance to the destination in the first embodiment. The two indicating hands may coaxially rotate or may rotate around separate axes.

The entire disclosure of Japanese Patent Application No. 2016-043649, filed Mar. 7, 2016 is expressly incorporated by reference herein.

What is claimed is:

1. An electronic timepiece comprising:
a first indicating hand;
a second indicating hand;
a receiver that receives position identification information for identifying a current position;
a magnetic sensor; and
a controller that determines a direction to a destination based on the position identification information received by the receiver, an output from the magnetic sensor, and destination information representing a position of the destination and determines a distance to the destination based on the position identification information and the destination information,
wherein the first indicating hand indicates the direction to the destination, and the second indicating hand displays the distance to the destination.

2. The electronic timepiece according to claim 1, wherein the controller switches, in accordance with the distance to the destination, a display range of the distance to the destination displayed with the second indicating hand.

3. The electronic timepiece according to claim 2, further comprising a third indicating hand,
wherein the third indicating hand displays the display range.

4. An electronic timepiece comprising:
a first indicating hand;
a second indicating hand;
a receiver that receives position identification information for identifying a current position;
a magnetic sensor; and
a controller that determines a direction to a destination based on the position identification information received by the receiver, an output from the magnetic sensor, and destination information representing a position of the destination and determines a direction to north based on the output from the magnetic sensor,
wherein the first indicating hand indicates the direction to the destination, and the second indicating hand indicates the direction to north.

5. An electronic timepiece comprising:
an indicating hand;
a receiver that receives position identification information for identifying a current position;
a magnetic sensor; and
a controller that determines a direction to a destination based on the position identification information received by the receiver, an output from the magnetic sensor, and destination information representing a position of the destination and determines a direction to north based on the output from the magnetic sensor,
wherein the direction indicated with the indicating hand is switched between the direction to the destination and the direction to north.

6. The electronic timepiece according to claim 5,
further comprising an operation section that accepts a user's operation,
wherein when the operation section accepts the user's operation, the direction indicated with the indicating hand is switched between the direction to the destination and the direction to north.

7. The electronic timepiece according to claim 5, further comprising a direction display section that displays the direction indicated with the indicating hand, the direction to the destination or the direction to north.

8. The electronic timepiece according to claim 1,
wherein the destination information is any of a plurality of pieces of positional information to each of which a number is given in advance, and
the electronic timepiece further comprises a number display section that displays the number given to positional information used as the destination information among the plurality of pieces of positional information.

9. The electronic timepiece according to claim 4,
wherein the destination information is any of a plurality of pieces of positional information to each of which a number is given in advance, and
the electronic timepiece further comprises a number display section that displays the number given to positional information used as the destination information among the plurality of pieces of positional information.

10. The electronic timepiece according to claim 5,
wherein the destination information is any of a plurality of pieces of positional information to each of which a number is given in advance, and
the electronic timepiece further comprises a number display section that displays the number given to positional information used as the destination information among the plurality of pieces of positional information.

11. The electronic timepiece according to claim 8,
wherein each of the plurality of pieces of positional information is information representing a position on a single path, and
the numbers are numbers according to an order in accordance with which the positions indicated by the plurality of pieces of positional information are arranged along the path.

12. The electronic timepiece according to claim 9,
wherein each of the plurality of pieces of positional information is information representing a position on a single path, and
the numbers are numbers according to an order in accordance with which the positions indicated by the plurality of pieces of positional information are arranged along the path.

13. The electronic timepiece according to claim 10,
wherein each of the plurality of pieces of positional information is information representing a position on a single path, and the numbers are numbers according to an order in accordance with which the positions indicated by the plurality of pieces of positional information are arranged along the path.

* * * * *